Oct. 18, 1927.
D. W. SMITH
1,645,627
PIE MAKING MACHINE
Filed March 15, 1924
2 Sheets-Sheet 1
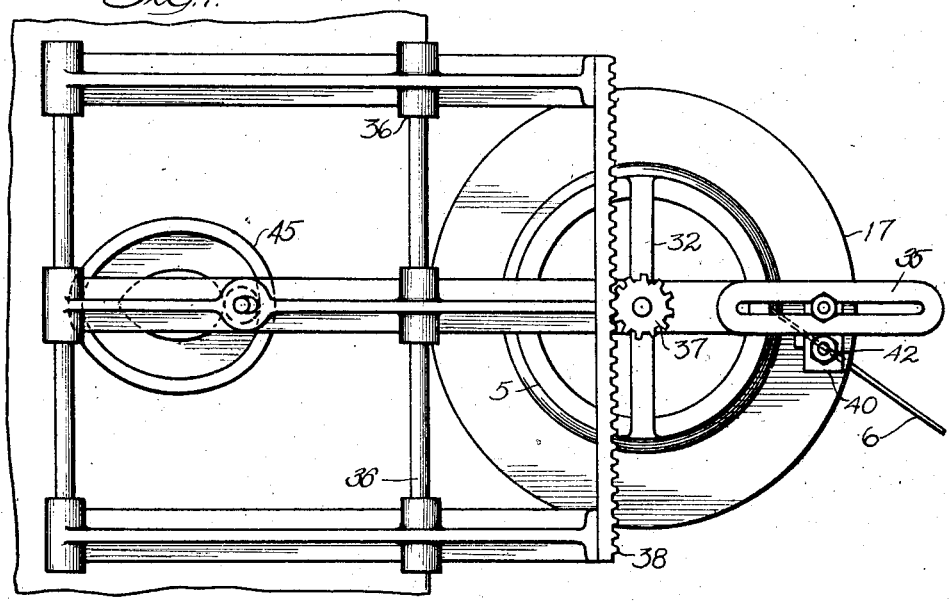
Fig. 1.
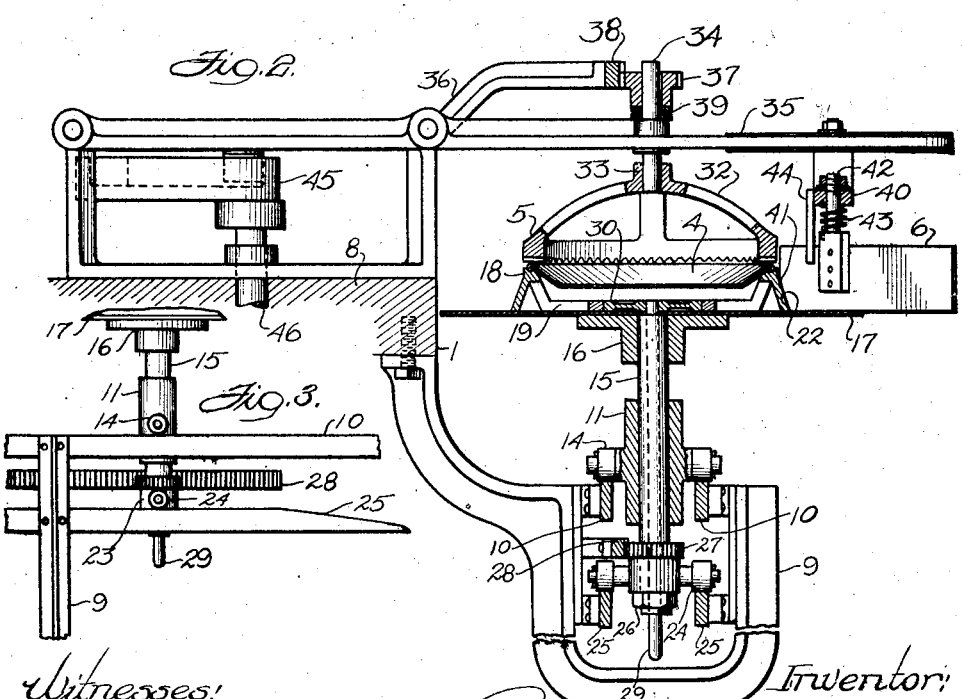
Fig. 2.
Fig. 3.
Witnesses:
Inventor:

Oct. 18, 1927.  1,645,627
D. W. SMITH
PIE MAKING MACHINE
Filed March 15, 1924  2 Sheets-Sheet 2
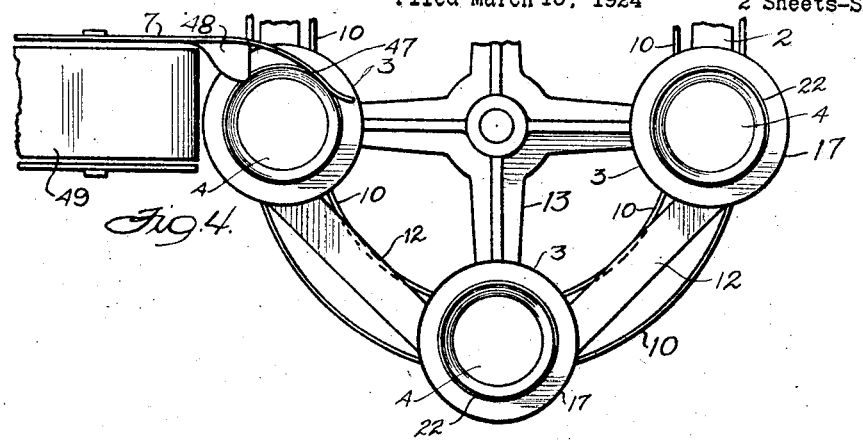
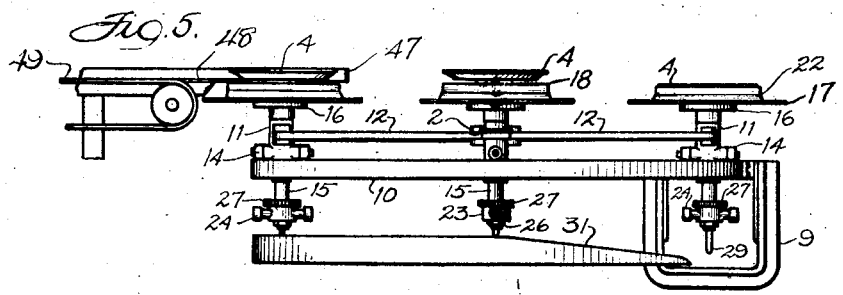
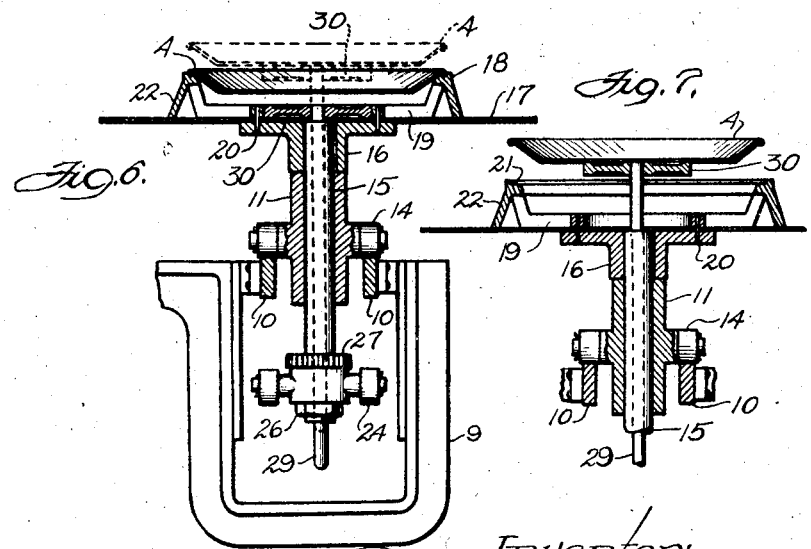

Patented Oct. 18, 1927.

1,645,627

UNITED STATES PATENT OFFICE.

DENNIS W. SMITH, OF WILMETTE, ILLINOIS, ASSIGNOR TO COLBORNE MANUFACTURING COMPANY, OF CHICAGO, ILLINOIS, A CORPORATION OF ILLINOIS.

PIE-MAKING MACHINE.

Application filed March 15, 1924. Serial No. 699,496.

This invention relates to pie-making machines wherein the various operations of making pies are performed while the pie tins are moved by a conveyer along a definite horizontal path.

The main objects of this invention are to provide improved mechanism for crimping pie crusts; to provide an improved crust trimming mechanism for cutting off the excess dough and discharging it into a suitable receptacle; to provide a pie-making machine of this kind wherein the crimping and trimming mechanisms are capable of being operated separately or substantially in unison with each other; to provide crimping and trimming mechanisms which are adjustable for accommodating pies of various sizes; to provide a machine of this kind which is capable of crimping and trimming pie crusts while the pies are being continuously carried along by the conveyer; to provide improved means for operating said crimping and trimming mechanisms in synchronism with the conveyer; and to provide improved mechanisms for discharging the finished pies from the machine.

An illustrative embodiment of this invention is shown in the accompanying drawings, wherein:—

Figure 1 is a fragmentary plan showing the crimping mechanism and trimming means.

Fig. 2 is a side elevation of the same showing also one of the pie plate carriers in its elevated position for the crimping and trimming operations; certain parts being shown in section for the sake of clearness.

Fig. 3 is a detail in elevation showing one of the carriers in its elevated position.

Fig. 4 is a fragmentary plan of one end of the machine showing the discharging mechanism.

Fig. 5 is an end elevation of the same.

Fig. 6 is a detail in section showing one of the carriers supported on the track; the normal position of the pie plate support being shown in full outline and the elevated position of the pie tin being shown in dotted outline.

Fig. 7 is a detail in section showing the pie tin in its elevated position ready to be discharged onto the delivery conveyer.

In the specific construction herein shown, the pie making machine to which this invention is applied comprises a frame, 1, on which is mounted an endless conveyer 2 which carries a plurality of improved plate supports 3, which support pie tins or plates 4, and which are movable through a predetermined path into co-acting relation with crimping mechanism 5 and trimming means 6. The finished pies are discharged from the moving supports 3 and delivered to a distant point by improved mechanism 7.

As herein illustrated, the frame 1 includes a central standard 8 having secured thereto a plurality of substantially U-shaped brackets 9, on which is mounted an endless track comprising a pair of parallel rails 10 which slidably support the conveyer 2.

The form of supporting frame 1 has no particular bearing upon the present invention, and, therefore, only such details of construction are herein shown as are believed to be necessary to clearly describe the crimping mechanism and trimming means and the discharging mechanism. The crimping mechanism and trimming means may be located at any point along the path of the conveyer 2, and the discharging mechanism is arranged at any convenient point in advance of the crimping mechanism for discharging the finished pies from the machine after they have been crimped and trimmed.

In the form shown, the conveyer 2 comprises a plurality of carriers 11 and a corresponding number of bars 12 pivotally connected together in alternating arrangement to form an endless belt which is moved through a predetermined path by a pair of sprockets 13, only one of which is herein shown. Journaled on the carriers 11, are rollers 14 which ride on the track 10. The conveyer 2 constitutes the subject of my copending application, Serial No. 578,837, filed July 31, 1922, wherein a more detailed description of the construction is given.

As herein illustrated, each of the pie plate supports 3 comprises a hollow post 15, loosely supported in a hollow carrier 11, and having rigidly mounted thereon a head 16 which supports a plate 17 and an annular rim 18. The plate 17 is located below the rim 18 and projects beyond said rim so as to catch the excess dough which is removed from the pies by the trimming means 6. The rim 18 includes a spider 19, which is rigidly secured to the plate 17 and head 16 by pins 20. Formed in the upper edges of the rim 18, is an annular groove 21 for supporting the rim of the pie tin 4. The side edges of the rim 18 are inclined downwardly and outwardly to form a substantially frusto-conical bearing surface 22 which is adapted to roll in contact with the trimmer 6 for scraping the excess off the edges of the dough, as hereinafter described.

Loosely mounted on the lower end of the post 15 is a collar 23, on which is journaled a pair of rollers 24 arranged to coact with a cam track comprising a pair of inclined rails 25 supported in one of the brackets 9 directly below the crimping mechanism 5. The cam track 25 is arranged to raise the plate supports 3 in succession while they are traveling along the track 10 to permit the pies to be acted upon by the crimping mechanism. The collar 23 is secured against vertical movement on the post 15 by a nut 26 and a gear 27 which are fixed on the post. The gear 27 is arranged to coact with a rack 28, which is supported at one side of the bracket 9 above the cam track 25, so that, when the plate support 3 is in its elevated position for the crimping operation, the post 15 will be rotated in the carrier 11 and the collar 23 for rolling the rim surface 22 in contact with the trimmer 6.

Extending through the hollow post 15, is a vertically movable plunger 29, having a head 30 which is adapted to be raised into contact with the pie tin 4 for lifting said tin into position to be discharged onto the delivery conveyer. The lower end of the plunger 29 projects beyond the lower end of the post 15 for engagement with a cam track 31 which is supported by the frame 1 adjacent the discharging mechanism 7.

As herein shown, the crimping mechanism 5 is in the form of a corrugated ring secured by spider arms 32 to a hub 33, which is fixed on the lower end of a vertical spindle 34. The ring 5 is of substantially the same diameter as the plate supporting rims 18, and is arranged so as to move a predetermined distance in synchronism with the conveyer 2 and in concentric relation to the supporting rim 18 during the crimping operation. The spindle 34 is journaled in a horizontal bracket or arm 35, which is slidably mounted on a frame 36 for carrying the crimper 5 a predetermined distance in synchronism with the conveyer 2. Fixed on the upper end of the spindle 34, is a gear 37 meshing with a rack 38, which is mounted on the frame 36. The gear 37 and rack 38 correspond in size to the gear 27 and rack 28 respectively so that the crimper 5 will rotate in unison with the supporting rim 18 while the latter rolls in contact with the trimmer 6. A ball bearing 39 is arranged on the spindle 34 between the gear 37 and arm 35. The spindle 34 is capable of a limited vertical movement relative to the arm 35 so as to permit a slight yielding of the crimper 5 when the pie plate is lifted into contact therewith.

In the specific form shown, the trimming means or scraper 6 comprises a vertically disposed plate which is carried by an adjustable bracket 40 of the arm 35 so as to move in unison with the plate supports 3 during the trimming operation. The inner edge of the scraper 6 is inclined to form a scraping edge 41 arranged to coact with the plate supporting rims 18 when the plate supports 3 are moved in succession along the conveyer. The scraper 6 is suspended from the bracket 40 by means of a bolt 42. Embracing the bolt 42, is a spring 43 arranged to normally urge the scraper 6 against a stop 44 for holding the scraper in position to coact with the rims 18.

During the movement of the conveyer 2, the bracket 35 is reciprocated in the frame 36 by a cam 45 fixed on a power shaft 46, so that when the plate supports 3 are moved in succession along the track 10, the bracket 35 is moved a predetermined distance in synchronism with the conveyer for the crimping and trimming operations, and the bracket 35 is then returned to bring the crimper 5 and scraper 6 into position to coact with the next succeeding plate support 3.

As herein shown, the mechanism for removing the pie tins 4 containing the finished pies from the plate supports 3 comprises a curved deflector member 47 which extends across the path of the pie tins so as to deflect them from the plunger heads 30 onto a horizontal shelf 48 and thence to a delivery conveyer 49. The deflecter 47 is located above the planes of the rims 18 and plunger heads 30 as to coact merely with the rims of the pie tins 4.

In operation, the plates 4 containing the pies to be crimped and trimmed are supported on the rims 18 of the supports 3 which are moved along the track 10 by the conveyer 2. When the pie approaches the crimping and trimming mechanisms, the rollers 24 coact with the cam track 25 for elevating the post 15 so as to bring the pie into position to be acted upon by the crimper 5. When the post 15 is in its elevated position, the gear 27 coacts with the rack 28 for rotating the post 15 while the plate supports move along the track 10 so as to cause the bearing surface 22 to roll in contact with the scraper edge 41 of the scraper 6.

During the movement of the conveyer, the cam 45 rotates continuously so as to reciprocate the supporting bracket 35, so that, when the plate supports are raised to the position shown in Fig. 2, the crimper 5 and trimmer 6 will move a predetermined distance in synchronism with the conveyer.

The trimmings which are removed from the dough by the scraper 6 drop into a suitable receptacle, not shown, which is located below the trimming mechanism. After leaving the crimping mechanism and scraper 6, the rollers 24 drop over the end of the cam track 25 and the plate support drops to the position shown in Fig. 6. When the plate support approaches the discharging mechanism, the plunger 29 coacts with the cam track 31 to lift the pie tin 4 away from the supporting rim 18, and when the pie tin reaches the deflector 47 it is deflected onto the delivery conveyor 49.

Although but one specific embodiment of this invention has been herein shown and described, it will be understood that numerous details of the construction shown may be altered or omitted without departing from the spirit of this invention as defined by the following claims.

I claim:

1. A device of the class described comprising a conveyer, pie plate supports carried by said conveyer, crimping mechanism located above said conveyer and movable in a horizontal path a predetermined distance in synchronism with said pie plate supports, and means for positively moving said plate supports upwardly for bringing the pies into position to be acted upon by said crimping mechanism.

2. A device of the class described comprising a conveyer, pie plate supports carried by said conveyer, crimping mechanism located above said conveyer and movable in a horizontal path a predetermined distance in synchronism with said pie plate supports, said crimping mechanism being adapted for a limited axial movement, and means for positively moving said plate supports upwardly for bringing the pies into position to be acted upon by said crimping mechanism, said plate supports being adapted to lift said crimping mechanism.

3. A device of the class described comprising a conveyer, rotatable pie supports carried by said conveyer, a scraper arranged to coact with the perimeter of said supports for trimming the edges of dough resting on said supports, mechanism for moving said scraper a predetermined distance in synchronism with said pie supports through a straight path paralleling an adjacent section of said conveyer, and means for rotating said supports while the latter are in contact with said scraper.

4. A device of the class described comprising a horizontal conveyer, a rotatable pie support carried by said conveyer and movable through a predetermined horizontal path, means for rotating said pie support during a part of its travel along said path, crimping mechanism located above said conveyer, a scraper arranged to coact with the perimeter of said support for trimming the edges of dough resting on said support, said crimping mechanism and scraper being movable through a horizontal path a predetermined distance in synchronism with said pie plate supports, and means for moving said plate supports upwardly for bringing the pie into engagement with said crimping mechanism and for simultaneously bringing the perimeter of said support into engagement with said scraper.

5. A device of the class described comprising a conveyer, a rotatable pie support carried by said conveyer and movable through a predetermined horizontal path, means for rotating said support during a part of its travel along said path, an arm arranged above said conveyer at substantially right angles to the path of said support, a scraper carried by said arm and arranged in position to coact with the perimeter of said support during the latter's rotation for trimming the edges of dough resting on said support, and mechanism for reciprocating said arm in a horizontal plane to cause said scraper to move a predetermined distance in synchronism with said pie support.

6. A device of the class described comprising a horizontal conveyer, rotatable pie supports carried by said conveyer and movable through a predetermined horizontal path, a rack located adjacent the path of said supports, a gear on each of said supports adapted to coact with said rack for rotating said supports in succession during a part of their travel along said path, an arm arranged above said conveyer at substantially right angles to the path of said supports, a scraper carried by said arm and arranged in position to coact with the perimeter of each of said supports during the latter's rotation for trimming the edges of dough resting on said supports, and mechanism for reciprocating said arm in a horizontal plane to cause said scraper to move a predetermined distance in synchronism with said pie supports.

7. A device of the class described comprising a horizontal conveyer, rotatable pie supports carried by said conveyer and movable through a predetermined horizontal path, a rack located adjacent the path of said supports, a gear on each of said supports adapted to coact with said rack for rotating said supports in succession during a part of their travel along said path, an arm arranged above said conveyer at substantially right angles to the path of said supports, a scraper adjustably mounted on said arm and arranged in position to coact with the perimeter of each of said supports during the latter's rotation for trimming the edges of dough resting on said supports, and a rotatable cam for reciprocating said arm in a horizontal plane to cause said scraper to move a predetermined distance in synchronism with said pie supports.

8. A device of the class described comprising a horizontal conveyer, rotatable pie supports carried by said conveyer and movable through a predetermined horizontal path, a rack located adjacent the path of said supports, a gear on each of said supports adapted to coact with said rack for rotating said supports in succession during a part of their travel along said path, a frame arranged substantially parallel to the path of said pie supports, an arm slidably mounted on said frame and arranged at substantially right angles to said path, a scraper adjustably mounted on said arm and arranged in position to coact with the perimeter of each of said supports during the latter's rotation for trimming the edges of dough resting on said supports, and a rotatable cam for reciprocating said arm in a horizontal plane to cause said scraper to move a predetermined distance in synchronism with said pie supports.

9. A device of the class described comprising a horizontal conveyer, a rotatable pie support carried by said conveyer and movable through a predetermined horizontal path, a rotatable crimping element located above said conveyer, means for moving said pie support upwardly into coacting relation with said crimping element while coacting therewith, trimming means arranged to coact with the perimeter of said support for trimming the edges of dough resting on said support, and mechanism for moving said crimping element and trimming means a predetermined distance in synchronism with said conveyer.

10. A device of the class described comprising a horizontal conveyer, rotatable pie supports carried by said conveyer and movable through a predetermined horizontal path, a reciprocating member located above said supports, a crimping element journaled on said member, means for moving said pie supports upwardly in succession into coacting relation with said crimping element, racks arranged substantially parallel to said conveyer, gears on said pie supports and crimping element adapted to coact with said racks for rotating said crimping element and the coacting pie support in synchronism, a scraper adjustably mounted on said reciprocating member and arranged to coact with the perimeter of said pie supports for trimming the edges of dough resting on said supports, and mechanism for synchronizing the movement of said reciprocating element with that of said conveyer during the engagement of said crimping element and scraper with said supports.

Signed at Chicago this 7 day of March 1924.

DENNIS W. SMITH.